3,487,058
PROCESS FOR IMPROVED INCORPORATION OF VINYL BROMIDE IN ACRYLIC POLYMERS
George Palethorpe, Durham, N.C., assignor to Monsanto Company, St. Louis, Mo., a corporation of Delaware
No Drawing. Filed Aug. 22, 1966, Ser. No. 573,794
Int. Cl. C08f 15/32
U.S. Cl. 260—85.5          2 Claims

ABSTRACT OF THE DISCLOSURE

The preparation of acrylonitrile-vinyl bromide polymers is improved by reducing the temperature of the vinyl bromide monomer feed to below ambient temperatures before it is introduced into the reaction zone.

---

This invention relates to an improvement in the preparation of polymers of acrylonitrile containing vinyl bromide interpolymerized therewith.

More particularly, the invention relates to an improved process wherein the incorporation of vinyl bromide into polymers containing acrylonitrile is enhanced.

Novel polymers of acrylonitrile containing up to about fifty weight percent of vinyl bromide have recently been discovered to provide highly useful synthetic textile fibers for a wide variety of uses including apparel and carpet fiber. These polymers are conveniently prepared through the use of classical aqueous redox catalyst systems at moderately elevated temperatures. One of the limiting features of this process for the preparation of acrylonitrile polymers is that when using vinyl bromide as a monomer to be interpolymerized therewith difficulty has been observed in incorporation of vinyl bromide into the polymer molecule. That is, large excesses of vinyl bromide had to be charged to the polymerization reactor to achieve given levels of vinyl bromide in the polymers prepared. Monomer volatilization prior to or during polymerization does not appear to be the reason for low incorporation in the polymer. Nevertheless, it is generally desirable to use pressure equipment where the level of vinyl bromide to be incorporated into the polymer is above about 10 percent by weight.

Low levels of incorporation of vinyl bromide in commercial systems require that unreacted vinyl bromide be recovered from the reaction mixture, separated and recycled to the polymerization stage of the process. Economics of the process can be enhanced by increasing incorporation of monomers to thereby reduce the volume requirements of separation and return systems in the overall process. In the latter respect it has been found that unreacted vinyl bromide is conveniently recovered from the reaction products by scrubbing the volatilized gases with chilled acrylonitrile or other liquid monomer employed in the system. The vinyl bromide recovered in this manner can be recycled to the reactor in solution with acrylonitrile or other liquid monomer for use at monomer feed.

It is therefore an object of this invention to provide an improved process for the preparation of polymers of acrylonitrile containing vinyl bromide interpolymerized therewith.

A particular object of the instant invention is to enhance incorporation of vinyl bromide in acrylonitrile polymers.

These and other objects of the invention are provided by reducing the temperature of the vinyl bromide monomer feed to below ambient temperatures before charging the reaction vessel therewith.

It has been discovered that by reducing the temperature of the vinyl bromide feed in the presence of acrylonitrile and other monomers, if present, to below about 25° C., preferably below about 15° C., and thereafter feeding the chilled vinyl bromide containing monomer feed to a reaction zone containing an aqueous redox catalyst, incorporation of vinyl bromide into the acrylonitrile polymer thereby prepared is appreciably enhanced.

The improvement of the instant invention is useful in the preparation of polymers containing at least about 50 percent by weight of acrylonitrile and from 1 to about 50 percent by weight of vinyl bromide. The invention is also applicable to the preparation polymers of acrylonitrile and vinyl bromide having interpolymerized therewith one or more different monoethylenically unsaturated monomers interpolymerizable therewith such as vinylidene chloride, vinyl acetate, methyl acrylate, acrylic acid, styrene and dye receptive monomers such as methyl vinyl pyridine, vinyl benzene sulfonic acids and the like. Ordinarily, such other monomers will be employed to provide less than about 15 percent by weight of the polymers where the polymer is desired for textile fiber applications.

Improvement may be observed in vinyl bromide incorporation according to this invention by reducing temperatures below 25° C. Particularly, good results have been observed at temperatures of around 15° C. and although no critical lower limit to the temperature at which the monomer mixture can be chilled has been determined it is generally impractical to cool the feed below about 0° C. Thus, the preferred temperature range lies between about 15° C. because that is the highest temperature for optimum incorporation and 0° C. because it is merely impractical to further reduce temperature in a commercial operation.

Thus, a preferred embodiment of the invention lies in chilling a mixture of acrylonitrile containing from about 1 to about 10 weight percent of vinyl bromide to below about 15° C. and then feeding the chilled monomer mix to a reaction zone in the presence of an aqueous redox catalyst held at temperature between about 30° C. and 60° C. to thereby enhance incorporation of the vinyl bromide in the polymer so produced.

The improvements described herein are applicable to a broad range of aqueous polymerization techniques and whether the polymerization is conducted as a semi-continuous or continuous process has not been found to constitute a critical aspect of the invention.

Thus, the polymerization is desirably carried out by procedures wherein the monomers are dispersed in the aqueous reaction medium either by suspension or emulsion. The polymerization may be catalyzed by known catalysts in equipment generally employed in the art. The preferred practice involves suspension polymerization whereby the polymer is prepared in finely divided form for use in fiber-forming operations. This may be accomplished through the use of semi-continuous techniques wherein the reaction vessel containing a precharged aqueous medium is charged with the monomer mixture and catalyst throughout the course of the reaction. Similarly, the invention is admirably suited to entirely continuous methods involving simultaneous addition of reactants and removal of polymers.

As above indicated the instant invention is adaptable to polymerization techniques which employ redox catalysts in the range of from about 30° C. to about 60° C., desirably between 40° and 50° C. Redox systems are well known and widely employed in the production of acrylic polymers.

The polymerization is catalyzed, for example, by means of water-soluble salts of peroxy acids, sodium peroxide, hydrogen peroxide, sodium perborate, the sodium salts of other peroxy acids, and other water-soluble compounds containing the peroxy group

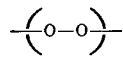

A wide variation in the quantity of peroxy compound is possible. For example, from 0.1 to 3.0 percent based on the weight of the polymerizable monomer may be used. Redox reducing agents are generally compounds in a lower valence state which are readily oxidized to the higher valence state under the conditions of reaction. Through the use of the reduction-oxidation system, it is possible to obtain polymerization to a substantial extent at lower temperatures than otherwise would be required. Suitable redox reducing agents are sulfur dioxide, the alkali metal and ammonium bisulfites, and sodium formaldehyde sulfoxylate. The pH of such systems is maintained on the acid side, preferably below 6.

The following example is given to illustrate the improvement of the instant invention and should not be construed to constitute the limits thereof.

EXAMPLE

In two separate polymer preparations monomer solutions containing acrylonitrile (AN), vinyl acetate (VA), and vinyl bromide (VBr) were continuously charged to a reaction vessel along with separate aqueous solutions of catalyst and activator at the same rate and for the same period of time to provide an overall weight ratio of reactants as indicated below with the major exception that the vinyl bromide containing monomer feed was chilled to 12° C. prior to being fed to the reactor in Preparation A, whereas, the monomers were fed to the reaction at about 25° C. in Preparation B.

The resulting polymers analyzed as follows:

|  | Preparation | |
|---|---|---|
|  | A | B |
| Viscosity ($\eta_{sp}$) | 0.157 | 0.155 |
| Weight percent VA | 7.1 | 7.2 |
| Weight percent VBr | 2.9 | 2.9 |
| Conversion (percent) | 72 | 65 |

Thus, it will be seen that by employing essentially the same conditions of polymerization to achieve the same level of vinyl bromide in polymers having practically the same specific viscosity it was necessary to employ about 31 weight percent more vinyl bromide in the preparation where the vinyl bromide had not been chilled than in the preparation where the monomer was chilled before being fed to the reaction zone.

I claim:
1. An aqueous polymerization process which comprises contacting a chilled monomer solution comprising at least about 50 weight percent of acrylonitrile and from 1–50 weight percent of vinyl bromide with a redox catalyst in a polymerization zone at temperatures ranging from about 30 to about 60° C., the improvement which comprises continuously adding the monomer solution chilled to between 0° C. and 15° C.
2. The process of claim 1 wherein the vinyl bromide comprises from about 1 to about 10 weight percent of the monomer solution.

| Prep. | AN | VA | VBr | H₂O | K₂S₂O₈ | SO₂ | NaHCO₃ | Fe* | Reaction temp., ° C. |
|---|---|---|---|---|---|---|---|---|---|
| A | 86.8 | 10.0 | 3.2 | 500 | 0.72 | 1.68 | 1.85 | 0.25 | 40 |
| B | 85.3 | 10.5 | 4.2 | 500 | 0.75 | 1.75 | 1.94 | 0.25 | 40 |

References Cited

UNITED STATES PATENTS

| 2,366,306 | 1/1945 | Alexander et al. | 260—85.5 X |
| 2,462,422 | 2/1949 | Plambeck | 260—85.5 X |
| 2,483,960 | 10/1949 | Baer | 260—85.5 X |
| 2,775,579 | 12/1956 | Erchak et al. | 260—85.5 X |
| 2,846,423 | 8/1958 | Hartmann. | |
| 2,862,912 | 12/1958 | Ott | 260—85.5 X |
| 2,982,761 | 5/1961 | Campbell. | |
| 3,068,212 | 12/1962 | Jenkins. | |

HARRY WONG, Jr., Primary Examiner

U.S. Cl. X.R.

260—79.3, 80.6, 80.72, 80.81